United States Patent Office 3,071,552
Patented Jan. 1, 1963

3,071,552
PHOSPHORUS AND BORON-CONTAINING POLYMERS
Anton B. Burg, Los Angeles, Calif., assignor, by mesne assignments, to American Potash & Chemical Corporation, a corporation of Delaware
No Drawing. Filed Aug. 20, 1958, Ser. No. 756,064
13 Claims. (Cl. 260—2)

This is a continuation-in-part of application Serial No. 593,365 filed June 25, 1956, and now U.S. Patent No. 2,541,001.

The present invention relates in general to the preparation of novel polymeric materials and more particularly to the preparation of certain novel polymeric materials through a reaction between various boron hydrides and certain phosphines.

It is an object of this invention to provide a group of basically inorganic polymers having unusual chemical properties, particularly when used in those applications where phosphorus and boron-containing materials are useful.

A further object of this invention is to provide methods for synthesizing various unusual polymers.

Ancillary objects and advantages of this invention, if not specifically set forth, will become apparent during the course of the detailed disclosure which follows.

Broadly, it has been found that polymeric substances may be formed by the reaction of diborane, pentaborane-9 and decaborane with tetramethylbiphosphine, trimethylphosphine, and certain aminophosphines. Two types of products are obtained when various of these phosphines are so reacted. The first type of product is a material known as a phosphinoborine. This is a material having the general formula $[R_2PBH_2]_x$, wherein the R's represent individual alkyl groups, or in some instances, where both R groups together represent a single polymethylene group, thus forming a ring including the P, and wherein the $x$ represents an integer indicative of the degree of polymerization. The greatest proportion of the phosphinoborine product obtained is so polymerized that $x$ represents three. Decreasingly smaller quantities of the higher polymers, the tetramer and others, are also present. The phosphinoborines display excellent dielectric properties and because of their extreme thermal and hydrolytic stability may be utilized wherever dielectrics for high temperature service are required.

A second type of polymeric product is obtained which exhibits unusual thermal and hydrolytic stability. These are relatively high polymers wherein the nitrogen and phosphorus bridging of the condensed boron hydride structure results in a high degree of thermal stability. They display excellent dielectric properties and are good metal adhesives. Thus, they find utility where thermally and chemically resistant dielectrics and metal adhesives are required. Additionally, they are suitable for use in gaskets and laminating resins where high temperature service is encountered.

More particularly, it has been found that polymers having high thermal and hydrolytic stability may be prepared where an aminophosphine of the general formula RR'NPR''R''', wherein the R's are lower alkyl or wherein the R and R' groups or the R'' and R''' groups taken a pair at a time represent single tetramethylene groups (that is, they may constitute a ring including either N or P) is reacted with a boron hydride such as $B_5H_9$, $B_2H_6$ or $B_{10}H_{14}$. The aminophosphines to be used may be prepared in accordance with the teachings of the above-mentioned co-pending application. The aminophosphine is absorbed by the pentaborane-9, diborane or decaborane and upon slow heating in a closed system, from which the volatile products can be removed under control, fair yields of the polymeric (primarily trimeric) phosphinoborine, large amounts of aminoboron hydrides and a second polymeric material stable at temperatures of 400° C. and above are obtained. At room temperature, this second type of polymeric product is resistant to the action of water, non-oxidizing acids and organic solvents but is dissolved slowly by nitric acid. The physical properties of these new polymeric materials can be varied by a choice of the hydrocarbon groups bonded to the phosphorus and nitrogen. Also, the physical properties of the second type of polymeric material obtained may be modified by heating the polymer to progressively higher temperatures. High temperatures drive off small amounts of volatile materials and induce cross linking which results in the formation of a glass.

Various examples are set forth below for illustrative purposes but are not to be construed as imposing limitations on the scope of the invention other than as set forth in the appended claims.

In the two examples set forth immediately below, a roughly 2 molar ratio of aminophosphine to pentaborane-9 was used.

Example I.—The first of the experiments involved 2.4018 g. (23.097 mmoles) of the $(CH_3)_2NP(CH_3)_2$ with 0.7123 g. (11.28 mmoles) of $B_5H_9$. These were brought to reaction at —50° C., quickly becoming warm to the touch. The result was a transparent brilliant-yellow liquid of moderate viscosity. Only a slight trace (0.063 mmole) of $H_2$ was formed by the spontaneous reaction, but brief heating at 120° C. developed a little more (0.71 mmole), along with traces of $(CH_3)_2PH$, $(CH_3)_2NBH_2$ (30 mg.), and lesser products. The $(CH_3)_2NP(CH_3)_2$ evidently was all absorbed. The yellow liquid now was heated in stages from 170° to 250° C., with frothing which was controlled by the rate of heating. After 90 minutes at 250° C., the volatile products were removed: 10.69 mmoles of $H_2$ (free of $CH_4$), 4.524 mmoles of $(CH_3)_2PH$, 2.159 mmoles of $[(CH_3)_2N]_2BH$, and 7.66 mmoles of $(CH_3)_2NBH_2$. A vacuum sublimation now removed 95 mg. of pure dimethylphosphinoborine trimer, which had to be isolated from 12 mg. of a gummy, chicle-like material having a far lower volatility. The accompanying volatile products (including some dimethylamine) brought the composition of the residue to approximately $[B_3H_5Me_2P(Me_2N)_{0.4}]_x$, a composition wherein the boron atoms are more than twice as numerous as the sum of N and P. In this case the product was initially an inert but brittle, slightly yellow solid, stable in air at 200° C. and insoluble in organic solvents. It became thermoplastic at about 200°–250° C.

Example II.—The next experiment was similar except that the course of heating was a little different: much higher temperatures were employed, and the final product accordingly was stabler and involved smaller proportions of H, P, and N. The initial components were 28.82 mmoles of $(CH_3)_2NP(CH_3)_2$ and 16.405 mmoles of $B_5H_9$. The bright yellow color seemed to be inherent in the absorption reaction, since it appeared in full chroma in spite of the best attempts to keep the temperature low during the process. The liquid had a jelly-like viscosity as it approached ice-temperature, but seemed fairly mobile at room temperature. The sample was heated at 162–176° C. for 12 hours, with the cold-finger cooled by running water, producing large crystal-fronds of the dimer of $(CH_3)_2NBH_2$. Most of the hydrogen now was removed through a trap at —196° C., but enough was left to prevent undue foaming as the container was heated to 290° C. during two hours. The volatile products now were removed and determined as well as possible, although there was a little interference from products which combined to form nonvolatile oils in very slight traces. The total $H_2$ was 17.18 mmoles (containing no more than 0.2% $CH_4$); and the removal of $(CH_3)_2PH$, aminoborines, and phosphinoborine (3.92 mmoles as monomer) brought the composition of the residue approximately to $$[B_4H_5Me_2P(Me_2N)_{0.9}]_x$$

including 44 mg. of the previously noted gummy product.

The residue now was heated to higher and higher temperatures—just slowly enough to control the frothing—with Dry-Ice in the cold-finger. During the entire 10-hour heating from 226 to 404° C. the product was a mass of bright yellow glue, forming large collapsible bubbles at first, but finally going to a honeycomb-foam during a final two hours at 404° C. Upon cooling, this solidified to a glass-foam which was very easily shattered into light yellow flakes. The tacky material was found as a 125 mg. drop of greenish glue hanging from the cold-finger; after standing in the air it turned hard. The total yield of trimeric dimethylphosphinoborine was 236 mg. (11% of the P).

The reaction balance now indicated the formula of the main product to be close to $$[B_4H_{3.4}(Me_2P)_{0.96}(Me_2N)_{0.89}]_x$$

slightly marred by the recovery of 1.47% of the original C as methane. The yield should have been about 2.3 g., but only 1.50 grams could be demonstrated, since some of it acted as a glaze upon the walls of the reaction tube, and could be removed only by boiling nitric acid. The insolubility of the yellow glass in benzene was demonstrated by an experiment in which it was Soxhlet-extracted for 3 hours, without appreciable loss of weight nor evident change of color.

The polymers secured through the procedure described above have been heated as high as 500° C. without any appreciable change of physical character. When the corresponding ethylated aminophosphines were treated, a material having somewhat greater plasticity was secured. However, the thermal stability displayed by the methyl compounds was, to some extent, lacking. The proportions of the reactants were varied so as to determine the effect thereof upon the product. The use of excess $B_5H_9$ (more than one equivalent $B_5H_9$ per two $R_2NPR_2$) leads to the recovery of the excess $B_5H_9$ and the effect of using an excess of the aminophosphine is as shown in the example which follows wherein a deficiency of pentaborane was tried.

*Example III.*—Samples of $B_5H_9$ (4.218 mmoles) and $(CH_3)_2NP(CH_3)_2$ (15.27 mmoles) were placed into the highly evacuated cold-finger apparatus and allowed to react during ten hours at —78° C. At room temperature, the product was a snow-white solid with a patch or two of faint yellow color. It melted in the range 70–80° C., to a faintly yellow liquid contrasting with the bright yellow of experiments using a more abundant proportion of $B_5H_9$. At this point, an apparatus failure prevented the assay of any unused aminophosphine, but it was possible to proceed with the making of the resins and the observation of a variety of by-products somewhat unlike those observed in experiments using more pentaborane.

On heating to 160° C. the mixture turned to the usual bright yellow color and produced a refluxing colorless liquid. The temperature was raised to 400° C. during 40 hours, with occasional removal of hydrogen and other volatile products: 4.40 mmoles of $H_2$, 0.1 mmole of $CH_4$, 1.82 mmoles of $(CH_3)_2NH$, 6.60 mmoles of $(CH_3)_2PH$, 9.7 mmoles of $[(CH_3)_2N]_2BH$, and a 2.53 mg. fraction having the volatility of dimeric $(CH_3)_2NBH_2$.

The final heating of the resin in vacuo, from 400 to 485° C. during 32 hours, yielded a further 1.65 mmoles of $H_2$, 1.03 mmoles of $CH_4$, and only traces of other volatile products. The cold-finger now had received a large proportion of gummy material from which it was difficult to isolate the $[(CH_3)_2PBH_2]_3$; maximum estimate of this, 150 mg. The gum proved to be quite insoluble in either acetone or benzene.

The resin, despite its exposure to a temperature of 485° C., had a light brown color and it was apparent that little damage occurred even at this temperature.

It appears that a low proportion of $B_5H_9$ leads to a larger production of gums and more volatile materials and somewhat less of a resin similar to that secured as a result of the previous experiments. A similar reaction is observed where $B_2H_6$ is substituted for $B_5H_9$.

*Example IV.*—A substance which was the dimethylaminocyclotetramethylenephosphine was prepared and a resin obtained by its reaction with pentaborane-9. The procedure was as follows:

A 500 ml. ether solution of 136 grams (0.93 mole) of $(CH_3)_2NPCl_2$ and a 600 ml. ether solution of the double Grignard reagent made from 200 grams of 1,4-dibromobutane were simultaneously added to 500 ml. of ether, well stirred under dry nitrogen in a two-liter three-neck flask at —78° C. During the two-hour process of introducing the reactants, the aminophosphorus chloride was kept in slight excess. The double Grignard solution tended to crystallize to a hard mass in the dropping funnel, but was kept fluid by the use of an infra-red lamp.

The reaction produced a crystalline mass which was stirred at —78° C. for an hour and then allowed to warm to room temperature during an additional hour. The loosely crystalline material then melted to a light brown gummy mass which could not be stirred. After one hour of refluxing, the ether solution was decanted from the gum, and the ether removed by distillation through a Vigreaux column. The nine-gram dimethylaminocyclotetramethylenephosphine product $(C_4H_8PN(CH_3)_2)$ was isolated by high vacuum distillation.

A by-product was obtained by returning the ether to the non-volatile residue and treating it with ammonia (200 grams) until there was no more warming and the gum had become crystalline. The filtered ether solution now was evaporated, yielding about one gram of the dimethylaminocyclotetramethylenephosphine and some 30 grams of a higher-boiling liquid.

The best evidence of the identity of the dimethylaminocyclotetramethylenephosphine was the formation of the cyclotetramethylenephosphine as a by-product of the resin-formation described below:

The compound $C_4H_8PN(CH_3)_2$ was then employed with $B_5H_9$ in two experiments directed toward forming a resin having physical properties affected by the large size of the $PC_4H_8$ group. One of the two experiments also afforded the opportunity to observe the effects of using a large proportion of $B_5H_9$.

The first of these experiments used 3.717 mmoles of $B_5H_9$ with 8.243 mmoles of $C_4H_8PN(CH_3)_2$. At —78° C., the mixture was a colorless liquid which developed the usual bright yellow color on warming to 22° C., and became more intensely yellow on heating to 100° C. Heating to 234° C. (under the water-cooled cold-finger) yielded 2.73 mmoles of $H_2$ (free of $CH_4$), 4.68 mmoles of $(CH_3)_2NBH_2$, and a 349.0 mg. fraction corresponding to $[(CH_3)_2N]_2BH$ but melted far lower. This fraction was augmented to 460.2 mg. by further heating of the residue for 5 hours in the range of 320–360° C. (total $H_2$ now 4.78 mmoles; still no $CH_4$). The whole fraction (vapor tension 10 mm. at 0° C.) now was heated with water to produce 1.5 mmole of $H_2$, corresponding to 150 mg. of $[(CH_3)_2N]_2BH$; the rest of the sample is presumed to have been 310 mg. of the cyclic $C_4H_8PH$, some of which was isolated and characterized.

The resin now appeared as light brown shavings forming a heap at the bottom of the reaction tube. It was heated from 360 to 486° C. during 6 hours, yielding 1.47 mmoles of $H_2$ (total now 6.25) and 3.17 mmoles of $CH_4$. There were also small proportions of other light hydrocarbons (mostly $C_2H_6$ with some $C_3$ and $C_4$ fractions) representing about 1.3 mmoles of C, or 4% of the ring carbon.

The cold-finger now carried a non-volatile white solid which dissolved in acetone only very slowly. After recrystallization to remove a tacky oil, the white needle-long flat-blade crystals melted in the sharp range 168.8–169.3° C. The product was analyzed and found to be $(C_4H_8PBH_2)_3$, and the molecular weight, determined by the freezing point method in benzene, was found to be 298 (calcd. 299.75).

Subject to fairly reasonable assumptions about the nature of some of the by-products, the final resin might have the approximate formula $(C_4H_8PB_3H_2)_x$. However, the absence of amine here may be illusory, for it is suspected that some amine impurity was present in the original simple of the $(CH_3)_2NPC_4H_8$.

The resin had retained its light brown color at 400° C., but it turned black during the heating to 486° C. After cooling the lustrous jet-black flakes were weighed as 305 mg., and a further 33.4 mg. of resin having a tarnished-brass color also could be recovered from the less heated side-wall of the reaction tube; total recoverable yield, 338 mg. (calcd., 432). The material proved to be extremely fragile, although possibly a little tougher than the resins from $(CH_3)_2NP(CH_3)_2$ and $B_5H_9$. It is believed that the blackening process had little effect upon the mechanical properties.

Tetramethylbiphosphine is prepared by a reaction between dimethylaminodimethylphosphine, $$(CH_3)_2NP(CH_3)_2$$

and dimethylphosphine, $(CH_3)_2PH$, to yield dimethylamine and the desired tetramethylbiphosphine. A yield of about 70% is obtained when the reaction is carried out at a temperature of 65° C. during 4 to 12 hours. Yields approaching 100% are obtained by recovering the unused reactants and heating them together again about three times. The example below shows the use of $P_2(CH_3)_4$ in the preparation of the novel polymers of this invention.

*Example V.*—The data obtained as the result of the two experiments which follow are summarized in Table 1. In each case the experiment was started by permitting the components to react while warming from —78° C. in a 50 ml. reaction tube attached to the high-vacuum system. The product was a white solid, fully incorporating both components. The reaction tube was arranged for multiple sealing and opening to the vacuum system, permitting the investigation of the volatile products after the stated periods of heating.

*Table 1*

THE $P_2(CH_3)_4$-$B_5H_9$ REACTION

| Expt. No. | Reactants (mmoles) | | Heating (° C.) | Products Removed (total mmoles) | | | |
|---|---|---|---|---|---|---|---|
| | $P_2(CH_3)_4$ | $B_5H_9$ | | $H_2$ | $CH_4$ | $(CH_3)_2PH$ | $(CH_3)_2PBH_2$ |
| 1 | 1.512 | 0.785 | 80 hrs. 240°<br>fast to 500°<br>12 days 132° | 0.734<br>1.86<br>1.023 | nil<br>0.23<br>nil | 0.228<br>same<br>0.232 | 0.3<br>0.45 |
| 2 | 6.570 | 3.767 | 27 hrs. 205°; 35 hrs. 290°<br>12 hrs. 346°; 2 hrs., lower end at 400° | 3.966<br>5.38 | nil<br>3.7 | 1.122<br>same | 5.0<br>est. 6.3 |

Also, 0.36 mmole of $(CH_3)_2PH·BH_3$ removed and identified by analysis.

The second experiment of this type was less dependable than the first, from a quantitative viewpoint, because the amine impurity was more prominent. This time the ratio of $B_5H_9$ to the aminophosphine was far higher (3.21 and 5.02 mmoles, respectively) and accordingly 23% (0.75 mmole) of the $B_5H_9$ could be recovered—along with 0.29 mmole of $(CH_3)_2NB_2H_5$—after the preliminary heating at 100° C. for 7.5 hours. This recovery of $B_5H_9$ brought the reactant-ratio nearly back to the more usual 1:2, which seems to represent the maximum useful proportion of $B_5H_9$. The further process of resin-formation was essentially the same as in several earlier experiments. This time, however, the trace of $[(CH_3)_2N]_3B_3H_4$ was clearly identified by its characteristic red spot at a crystal junction observed between crossed polaroids. The parallel yield of $[(CH_3)_2N]_2B_4H_6$ was estimated at 0.03 mmole. Also, there was a trace of a new liquid having a vapor tension of 1 mm. at 100° C., and a still less volatile solid which formed from the material originally passing the cold-finger under high vacuum. The methanol solvolysis of the 1 mm. liquid gave equimolar proportions of dimethylamine and methyl borate. The yield of the $(C_4H_8PBH_2)_3$ this time was 110 mg., or 1.4 times as much as in the first experiment. The yield of ring-phosphine was very small.

The resin from this second amino-cyclic-phosphine experiment was heated only to 410° C., and was believed to be darkening slightly at that temperature. Scarcely any production of hydrocarbons could be detected up to this point. After cooling, the resin was taken out in the form of light-yellow-brown fritted-glassy lumps and flakes. The recoverable yield was 302 mg. This material proved to be insoluble in the usual organic liquids and inert to hydrochloric acid, but soluble in hot nitric acid without forming phosphate.

As stated before, these boron hydrides can also be caused to react with tetramethylbiphosphine, $P_2(CH_3)_4$.

In the early stages of each experiment the expected cleavage of pentaborane into $BH_3$ and polyborine fragments was apparent, while the chief effect upon the $P_2(CH_3)_4$ was splitting the P-P bond. One-half of the $(CH_3)_2P$ groups were either used to form $(CH_3)_2PBH_2$ units or incorporated in the borane polymer, while the other half went to form $(CH_3)_2PH$. This was partly recovered as such, but mostly used in phosphinolyzing $BH_3$ groups or higher boranes. Its role in complexing the $BH_3$ groups was clearly shown in Experiment 2, since an appreciable amount of the adduct $(CH_3)_2PH·BH_3$ could be isolated after the relatively mild initial heating.

This experiment also included much observation of the non-volatile products at various stages. After cooling from 132° C. the mass appeared as a buttery-viscous yellow liquid, which became glue-like (at 25° C.) after the 205° C. heating. After the 290° C. heating, the removal of the $(CH_3)_2PBH_2$ trimer and tetramer (by evacuation at 100° C.) left an ivory-colored foamy residue which melted back to a yellow liquid during the 346° C. heating. At this point the tube was cooled back to room temperature and the yellow glassy product adhered firmly (with some crazing) to the Pyrex wall of the reaction tube, but cracked off on cooling to —196° C. The amber-colored shards and lumps (400 mg., or 38.5% of the weight of the original reactants) no longer were thermoplastic, for they retained their sharp edges even on heating to 402° C. The loss of thermoplasticity might be correlated with the formation of methane, which should be accompanied by further P-B cross-linking. However, the similar product of Experiment 1 remained light-colored and transparent even after brief heating to 500° C.

Along with the strictly non-volatile amber product of Experiment 2 there were at least two other materials which could not be evaporated under high vacuum at 100° C. One was a high-temperature sublimate amounting to 38 mg., or 3.7% of the original reactants. It dissolved in acetone and began to crystallize upon evaporation to 5 ml. A comparable amount of a strictly non-volatile white product could not be dislodged from the tube wall by any means, except incompletely by boiling nitric acid. This material is an attractive thermally stable adhesive.

*Example VI.*—In the following example, the reaction between $P_2(CH_3)_4$ and diborane was investigated.

The reaction between $P_2(CH_3)_4$ (1.154 mmoles) and $B_2H_6$ (1.159 mmoles) was completed during a 15-hour warming from $-44°$ to $-5°$ C., with the formation of only 0.01 mmole of $H_2$ and recovery of 0.006 mmole of $B_2H_6$. Hence the formula of the adduct was almost exactly $P_2(CH_3)_4(BH_3)_2$. It seemed to be a single substance, for it could be wholly sublimed in vacuo during some hours at 25° C., but had no directly observable vapor tension at that temperature. Its white crystals did not melt below 170° C., at which there was a slow decomposition seeming not to involve dissociation of the P–B bonding. It was scarcely affected by air and water, but very soluble in acetone.

The structural formula of this adduct presumably is

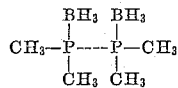

a pattern like that of $C_2(CH_3)_6$ but with some polarity to lower the volatility. Its high stability would seem surprising in view of the usual experience that the bonding of a second electron-acceptor unit, to a compound having two adjacent base-functioning atoms, is greatly weakened by the inductive and formal-charge effects of forming the first dative bond. This idea is related to the principle that the second proton of a diprotic acid is held more firmly after the first has been removed, especially if the basic sites are close together in the molecule. In the present case, however, we can understand that B–H bonding electrons contribute much to the stability of the B–P bonding (through the use of P-3d orbitals) and that this effect sharply decreases the interaction of the lone-pair electrons of the second P atom with the 3d orbitals of the first. The dipole effect also would be diminished by such action of the B–H electrons. Hence the second P atom retains excellent base-strength and firmly bonds the second $BH_3$ group.

A 1.191 mmole sample of $P_2(CH_3)_4(BH_3)_2$ was unaffected by heating at 154° C. for 5 hours, but after 11 hours at 170° C., followed by 9 hours at 197–200 C., the melting range was roughly observed as 70–90° C. Now the tube was opened and the $H_2$ was measured as 1.262 mmole, or 6% more than expected according to the equation

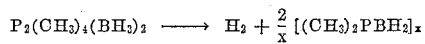

There was also 0.094 mmole of $(CH_3)_2PH$. The slightly volatile products were resolved into 129 mg. of

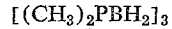

(M.P. 88° C.), 25.3 mg. of $[(CH_3)_2PBH_2]_4$ (M.P. 160° C.), and 15.5 mg. of a white gum which failed to sublime at 100° C. under high vacuum. This material proved to be readily soluble in acetone, indicating no very high degree of cross-linking. The reaction balance would give its empirical formula as $[(ME_2P)_6B_9H_{11}]_x$. However, this material represented less than 10% of the original $(CH_3)_2P$ groups, so that the formula could not be very precisely determined. The yield of trimer and tetramer of $(CH_3)_2PBH_2$ was nearly 90%; however, the experiment had the special value of indicating the existence of resin-like higher polymers not requiring amino groups for considerable stability.

*Example VII.*—An experiment starting with 5.83 moles of $(CH_3)_3P$ per mole of $B_5H_9$ was carried through the stages indicated in Table 3. The combining ratio in the initial adduct could not be determined because of solid-solution effects.

*Table 3*

THE TRIMETHYLPHOSPHINE–PENTABORANE REACTION

| Heating Process | Average Formula of Non-Volatile Product | Description |
|---|---|---|
| 18 hrs., 155° C., sealed tube. | $(Me_3PB_{2.17}H_{2.70})_x$ | Transparent glass and a creamy-white solid. |
| 3 hrs., 203° C., open to high-vacuum system. | $(Me_3PB_{3.18}H_{3.05})_x$ | Transparent light-brown glass. |
| 60 hrs., 250° C., sealed tube. | $(Me_3PB_{5.12}H_{3.47})_x$ | Thermoplastic: fragile glass below 130°; viscous liquid above 260° C. Trace of white sublimate. |
| Briefly 352° C., open to high-vacuum system. | $(Me_3PB_{5.27}H_{3.30})_x$ | Golden glassy residue and white sublimate volatile at 250° C. |
| Rising to 432° C. in 4 hrs., open to vacuum. | $(Me_3PB_{5.27}H_{2.73})_x$ | Golden glass and more sublimate. |
| Rising to 488° C. in 4 hrs., open to vacuum. | $(Me_3PB_{5.27}H_{1.26})_x$ | Dark brown cinder and equal amount of sublimate. |

The first two stages yielded a total of 2.20

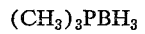

per $B_5H_9$, and thereafter no more of this complex was observed. The evolution of $(CH_3)_3P$ ceased during the heating to 352° C., and the first trace of methane came at 432° C. The white sublimate was partially soluble in methanol, but about half of it was insoluble. A very small part of the sublimate reacted with a methanol-HCl mixture during two days at 132° C., yielding 0.098 mmole of $H_2$ and 0.057 mmole of $B(OH)_3$; any $(CH_3)_3P$ presumably went to form $(CH_3)_3PHCl$. Surviving the methanol-HCl attack was the white insoluble material and a solute which gave a voluminous milky precipitate upon addition of water.

It appears that the main sublimate consisted of

material, some having molecular weights low enough for solubility in methanol (but no reactivity toward it) and some having the high molecular weights which would correlate with insolubility in the case of non-chain structures. The whole system would be represented as fragments of an infinite boron hydride polymer, stabilized by the electron-donor bonding effect of entrapped trimethylphosphine.

It is seen that when trimethylphosphine is used as the second reactant, a phosphinoborine is not produced but rather the only reaction products are the phosphine borine by-product, $(CH_3)_3P \cdot BH_3$ and a material which may be termed a "phosphinated boron hydride polymer," the product which is termed elsewhere in the specification the "second type of polymeric product." However, when any of the other phosphorus-containing materials listed above are reacted with the boron hydride, whether diborane, pentaborane-9 or decaborane, two reaction products are secured; on the one hand, the phosphinoborine polymer and, on the other, the phosphinated boron hydride polymer having a different structure but similar properties insofar as the dielectric constant and dissipation factor is concerned. Hence, all products of the various reactions find use as dielectrics.

The phosphinoborines secured are ring materials and have the general formula $[(CH_3)_2PBH_2]_{3,4}$. That is, these materials form closed rings composed of three or four monomers of the general formula $(CH_3)_2PBH_2$ joined one to the next by means of phosphorus to boron bonds. Small amounts of higher polymers of the same nature are present also. Such materials are to be distinguished from the linear phosphinoborines secured by certain other processes, such as that set forth in my co-pending application Serial No. 678,429 filed August 15, 1957.

As can be seen from the foregoing, significant variations in the ratios of reactants are possible.

Obviously many modifications and variations of the invention as hereinbefore set forth may be made without departing from the spirit and scope thereof, and therefore only such limitations should be imposed as are indicated in the appended claims.

I claim:

1. A process for the preparation of a phosphinated boron hydride polymer and a closed ring phosphinoborine which comprises: mixing pentaborane-9 with tetramethylbiphosphine and heating the mixture so formed to a temperature of at least about 120° C.

2. A process for the preparation of a phosphinated boron hydride polymer and a closed ring phosphinoborine which comprises: mixing diborane with tetramethylbiphosphine and heating the mixture so formed to a temperature of at least about 120° C.

3. A process for the preparation of a nitrogen-containing phosphinated boron hydride polymer which comprises: contacting pentaborane-9 with an aminophosphine of the general formula RR′NPR″R‴ wherein R and R′ are selected from the class consisting of two individual lower alkyl groups and a single polymethylene group and R″ and R‴ are selected from the class consisting of two individual lower alkyl groups and a single polymethylene group and heating the mixture so formed to a temperature of at least about 120° C.

4. The process of claim 3 wherein the aminophosphine is dimethylaminodimethylphosphine.

5. The process of claim 3 wherein the aminophosphine is dimethylaminocyclotetramethylenephosphine.

6. A process for the preparation of a phosphinated boron hydride polymer, a closed ring phosphinoborine and a nitrogen-containing phosphinated boron hydride polymer, respectively, comprising: mixing a boron hydride with a compound selected from the class consisting of tetramethylbiphosphine and a compound of the formula RR′NPR″R‴ wherein R and R′ are selected from the class consisting of two individual lower alkyl groups and a single polymethylene group and R″ and R‴ are selected from the class consisting of two individual lower alkyl groups and a single polymethylene group and heating the mixture so formed to a temperature of at least about 120° C.

7. As new compositions of matter, the phosphinated boron hydride polymer and nitrogen-containing phosphinated boron hydride polymer obtained respectively when diborane is mixed with a second compound selected from the class consisting of tetramethylbiphosphine and a compound of the general formula RR′NPR″R‴ wherein R and R′ are selected from the class consisting of two individual lower alkyl groups and a single polymethylene group and R″ and R‴ are selected from the class consisting of two individual lower alkyl groups and a single polymethylene group and the temperature thereof is adjusted to a level sufficient to cause a reaction to yield said phosphinated boron hydride polymer and said nitrogen-containing boron hydride polymer respectively.

8. As new compositions of matter, the phosphinated boron hydride polymer and the nitrogen-containing phosphinated boron hydride polymer obtained respectively when pentaborane-9 is mixed with a second compound selected from the class consisting of tetramethylbiphosphine and a compound of the general formula

RR′NPR″R‴ wherein R and R′ are selected from the class consisting of two individual lower alkyl groups and a single polymethylene group and R″ and R‴ are selected from the class consisting of two individual lower alkyl groups and a single polymethylene group and the temperature thereof is adjusted to a level sufficient to cause a reaction to yield said phosphinated boron hydride polymer and said nitrogen-containing phosphinated boron hydride polymer respectively.

9. As a new composition of matter, the phosphinated boron hydride polymer obtained by mixing pentaborane-9 with tetramethylbiphosphine and the temperature of the mixture so formed is adjusted to a level of at least about 120° C.

10. As a new composition of matter, the phosphinated boron hydride polymer obtained by mixing diborane with tetramethylbiphosphine and the temperature of the mixture so formed is adjusted to a level of at least about 120° C.

11. As a new composition of matter, the nitrogen-containing phosphinated boron hydride polymer obtained by mixing pentaborane-9 with an aminophosphine of the general formula RR′NPR″R‴ wherein R and R′ are selected from the class consisting of two individual lower alkyl groups and a single polymethylene group and R″ and R‴ are selected from the class consisting of two individual lower alkyl groups and a single polymethylene group and the temperature of the mixture so formed is adjusted to a level of at least about 120° C.

12. The product of claim 11 wherein the aminophosphine is dimethylaminodimethylphosphine.

13. The product of claim 11 wherein the aminophosphine is dimethylaminocyclotetramethylenephosphine.

References Cited in the file of this patent

Hewitt et al.: Journal of Chemical Society (London), pages 530–4, 1953.

Burg et al.: J.A.C.S., vol. 75, Aug. 20, 1953, pp. 3872–3877, 260-2 M.